US007172402B2

(12) United States Patent
Hofmann

(10) Patent No.: US 7,172,402 B2
(45) Date of Patent: Feb. 6, 2007

(54) MOLD JAW HALVES FOR AN APPARATUS FOR PRODUCING TRANSVERSELY RIBBED TUBES

(75) Inventor: Gunther Hofmann, Hassfurt (DE)

(73) Assignee: Unicor GmbH Rahn Plastmaschinen, Hassfurt (DE)

(*) Notice: Subject to any disclaimer, the term of this patent is extended or adjusted under 35 U.S.C. 154(b) by 0 days.

(21) Appl. No.: 10/537,045

(22) PCT Filed: Nov. 26, 2003

(86) PCT No.: PCT/DE03/03905

§ 371 (c)(1),
(2), (4) Date: Jun. 1, 2005

(87) PCT Pub. No.: WO2004/052621

PCT Pub. Date: Jun. 24, 2004

(65) Prior Publication Data

US 2006/0057242 A1 Mar. 16, 2006

(30) Foreign Application Priority Data

Dec. 9, 2002 (DE) ............................... 102 57 363

(51) Int. Cl.
*B29C 47/90* (2006.01)

(52) U.S. Cl. ................... 425/233; 425/325; 425/326.1; 425/336; 425/369; 425/384; 425/392; 425/396

(58) Field of Classification Search ................ 425/233, 425/325, 326.1, 336, 369, 384, 387.1, 388, 425/392, 396

See application file for complete search history.

(56) References Cited

U.S. PATENT DOCUMENTS

| | | | | |
|---|---|---|---|---|
| 4,492,551 | A | 1/1985 | Hegler et al. | |
| 5,531,583 | A * | 7/1996 | Berns et al. | 425/326.1 |
| 5,573,787 | A * | 11/1996 | Lupke et al. | 425/233 |
| 6,149,421 | A * | 11/2000 | Kossner | 425/233 |
| 6,206,670 | B1 * | 3/2001 | Neubauer | 425/336 |
| 6,309,205 | B1 * | 10/2001 | Neubauer | 425/233 |
| 6,457,965 | B1 * | 10/2002 | Hegler | 425/233 |
| 6,773,253 | B2 * | 8/2004 | Hegler | 425/326.1 |

FOREIGN PATENT DOCUMENTS

DE 19702647 C1 2/1998

* cited by examiner

*Primary Examiner*—Robert Davis
*Assistant Examiner*—Joseph Leyson
(74) *Attorney, Agent, or Firm*—Jan K. Simpson; Fulbright & Jaworski LLP

(57) ABSTRACT

Described is a mold jaw half for an apparatus for the production of transversely ribbed tubes, wherein the mold jaw half (16) has end faces and a base face and in its interior a cooling passage with a coolant feed and a coolant discharge, which open at a spacing from each other at the base face of the mold jaw halves. In order to provide a reduced flow resistance for the coolant through the cooling passage and consequently an increased coolant through-put, resulting in an improved cooling action, it is proposed that the coolant feed and the coolant discharge cross, as seen in a direction viewing on to the end faces of the mold jaw halves, and are oriented in opposite relationship with respect to the advance direction of the mold jaw half. That mutually opposite orientation provides that the coolant is virtually shovelled into the cooling passage.

4 Claims, 4 Drawing Sheets

16
32
20
30
34
26
22
28
40
38
42
36

26
V
30
50
32
50
54
34
36
52
48
46
28
52

54
50
32
26
30,34
28
52
46
44
36
48

MOLD JAW HALVES FOR AN APPARATUS FOR PRODUCING TRANSVERSELY RIBBED TUBES

CROSS-REFERENCE TO RELATED APPLICATIONS

This application is a national stage filing of PCT/DE03/03905 filed Nov. 26, 2003 claiming priority to DE 10257363.8 filed Dec. 9, 2002.

TECHNICAL FIELD

The invention concerns a mold jaw half for an apparatus for the production of transversely ribbed tubes, wherein the mold jaw half has end faces which are provided oriented in the advance direction along a mold section in mutually parallel and closely mutually juxtaposed relationship and bear closely and in positively locking relationship against each other and a base face and in its interior a cooling passage with a coolant feed and a coolant discharge for a coolant, which open at a spacing from each other at the base face of the mold jaw.

BACKGROUND OF THE INVENTION

An apparatus for the production of transversely ribbed tubes is described for example in DE 197 02 647 C1.

The coolant feed and the coolant discharge are connected to associated cooling passage portions which are in flow communication at their end remote from the coolant feed and discharge, by means of a passage communicating portion.

In known mold jaw halves the coolant feed, the cooling passage main portion adjoining same, the cooling passage communicating portion adjoining same, the main portion adjoining same and the coolant discharge adjoining same are of a configuration extending in a U-shape, viewed in a direction on to the end faces of the mold jaw half. Such a configuration, that is to say such a formation for the cooling passage, gives rise to a given flow resistance for the coolant as it flows through the cooling passage, the coolant being in particular water. That flow resistance causes a correspondingly reduced through-put of coolant, that is to say water, through the cooling passage of the respective mold jaw half. That has a corresponding effect on the productivity of the apparatus for the production of transversely ribbed tubes.

A corresponding consideration applies for the apparatus for the production of transversely ribbed tubes, which is known from U.S. Pat. No. 4,492,551, wherein each mold jaw half of that known apparatus has end faces which along a mold section are provided oriented in the advance direction in mutually parallel and closely mutually juxtaposed relationship and bear in positively locking relationship against each other and a base face and in its interior a cooling passage having a coolant feed and a coolant discharge for a coolant, which open at the base face of the mold jaw at a spacing from each other. In that known mold jaw half the cooling passage has a first cooling passage portion and a second cooling passage portion spaced therefrom in the advance direction of the mold jaw half and a cooling passage communication portion which connects the first and second cooling passage portions together and which extends in a v-shaped configuration. The first cooling passage portion is connected to a cooling water feed and the second cooling passage portion is connected to a cooling water discharge which—as can be seen from FIGS. 2 and 3 of that state of the art—as viewed in a direction viewing on to the end face of the mold jaw half, are oriented in mutually parallel relationship. Therefore, in a direction viewing on to the end face of the mold jaw half, the respective cooling passage is of a configuration extending in a U-shape—similarly to the case with the apparatus in accordance with above-mentioned DE 197 02 647 C2.

In consideration of those factors the object of the invention is to provide a mold jaw half of the kind set forth in the opening part of this specification, wherein the coolant or water through-put through the cooling passage is increased.

BRIEF SUMMARY OF THE INVENTION

In accordance with the invention, in a mold jaw half of the kind set forth in the opening part of this specification, that object is attained in that the coolant feed and the coolant discharge cross—as viewed in a direction viewing on to the end faces of the mold jaw halves—and are oriented in opposite relationship with respect to the advance direction of the mold jaw halves in order to provide that the coolant is shovelled into the cooling passage.

By virtue of such a configuration for the cooling passage, that is to say the coolant feed and the coolant discharge of the cooling passage, in an orientation in opposite relationship to the advance direction of the mold jaw, the coolant, preferably water, which flows into the coolant feed, is so-to-speak shovelled into the cooling passage so that an increased level of water or coolant through-put and a corresponding improvement in the cooling action of the coolant or water in the cooling passage of the mold jaw half is afforded. An apparatus for the production of transversely ribbed tubes, which is equipped with mold jaw halves according to the invention, enjoys a correspondingly improved level of productivity.

In the case of the mold jaw half according to the invention, the coolant feed and the coolant discharge—viewed in a direction viewing on to the end faces of the mold jaw halves—can be of a mirror-image symmetrical configuration in order to achieve correspondingly symmetrical flow conditions through the cooling passage of the mold jaw half.

It has proven to be advantageous if, in the mold jaw half according to the invention, the coolant feed and the coolant discharge—seen in a direction viewing on to the end faces of the mold jaw half—are each of an arcuately curvedly extending configuration, because, by virtue of such a configuration, the coolant or the water is optimally shovelled into the cooling passage of the mold jaw half upon the advance movement thereof and is discharged again through the coolant discharge. According to the invention the coolant feed and the coolant discharge—viewed in the advance direction of the mold jaw—are laterally displaced relative to each other and adjoin arcuate cooling passage main portions which, seen in the direction viewing on to the end faces of the mold jaw half, are in mutually spaced parallel relationship and which—viewed in the advance direction of the mold jaw—are provided in coincident relationship.

Mold jaw halves according to the invention can be easily produced in a casting process, in which respect it will be appreciated that the casting process is followed by a finishing machining process. Mold jaw halves according to the invention have a cooling passage with a reduced flow resistance so that the through-put of coolant or water through the cooling passage is increased and consequently the cooling action is improved.

Further details, features and advantages will be apparent from the description hereinafter of an embodiment illustrated in the drawing of an apparatus for the production of transversely ribbed tubes or two mold jaw halves of said apparatus and a mold jaw half in a direction of view on to the end faces thereof and an illustration of the cooling passage of such a mold jaw half as a front view and a side view.

DETAILED DESCRIPTION OF THE INVENTION

Figure 1:
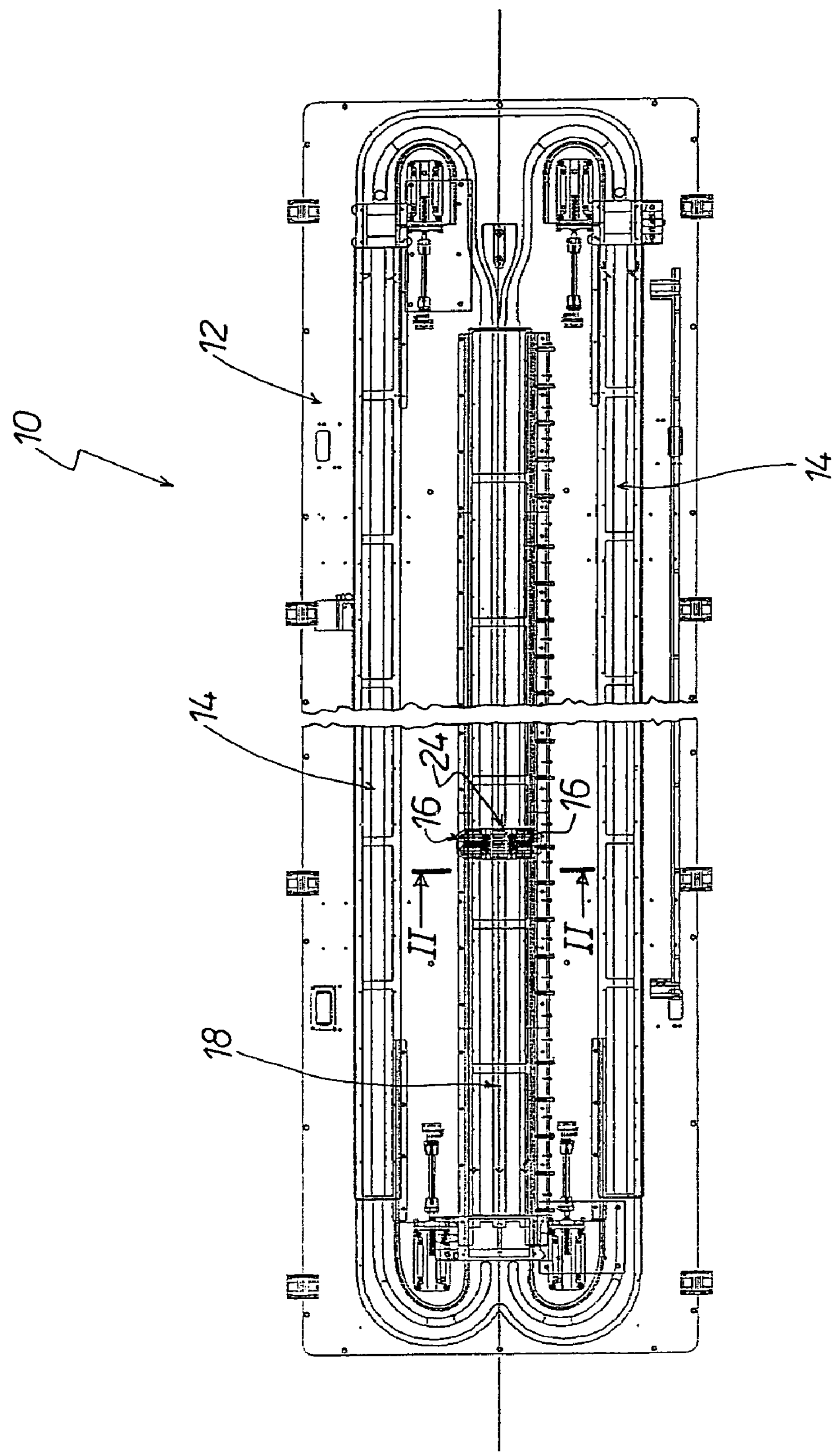
FIG. 1 is a cut-away plan view of an embodiment of an apparatus for the production of transversely ribbed tubes.

FIG. 1 is a cut-away view from above showing an embodiment of the apparatus 10 for the production of transversely ribbed tubes with a base arrangement 12 having two endless guide paths 14 for mold jaw halves 16. Only two of those mold jaw halves 16 are shown in FIG. 1. The apparatus however is provided with such a number of jaw halves 16 that the mold jaw halves 16 bear in positively locking relationship against each other along the respective guide path 14.

Figure 2:
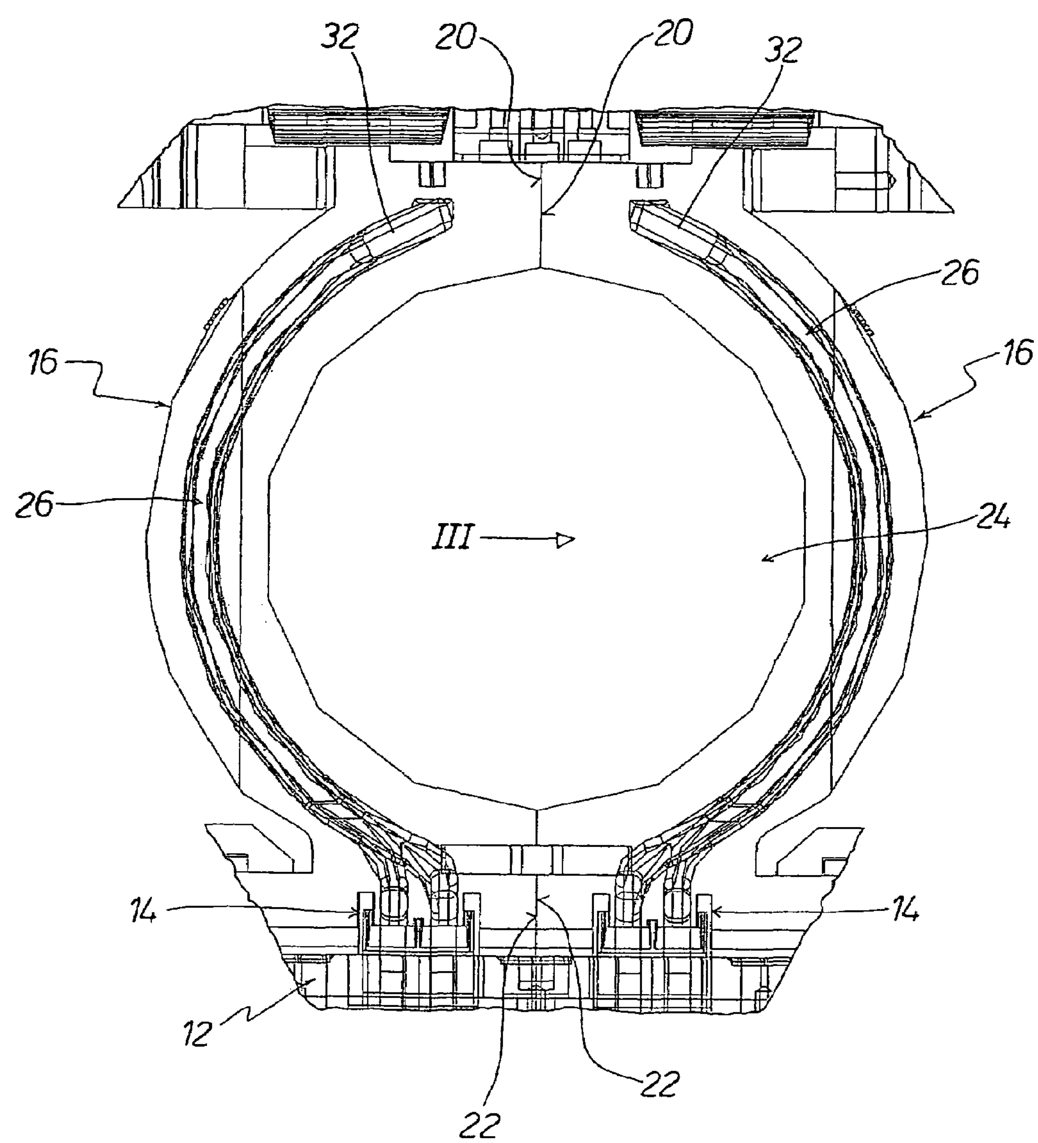
FIG. 2 is a view in section taken along section line II—II in FIG. 1 to show two mold jaw halves which at the mold section of the apparatus of FIG. 1 form a mold passage for the production of a transversely ribbed tube.

FIG. 2 is a view in the direction of the arrows II—II in FIG. 1 showing two mold jaw halves 16 which bear snugly and in positively locking relationship against each other with their end faces 20 and 22 along a mold section 18 (see FIG. 1), along which the two guide paths 14 are provided in mutually parallel and closely juxtaposed relationship, so that the mold jaw halves along the mold section 18 form a mold passage 24 in which a transversely ribbed tube is formed in per se known manner.

Figure 3:
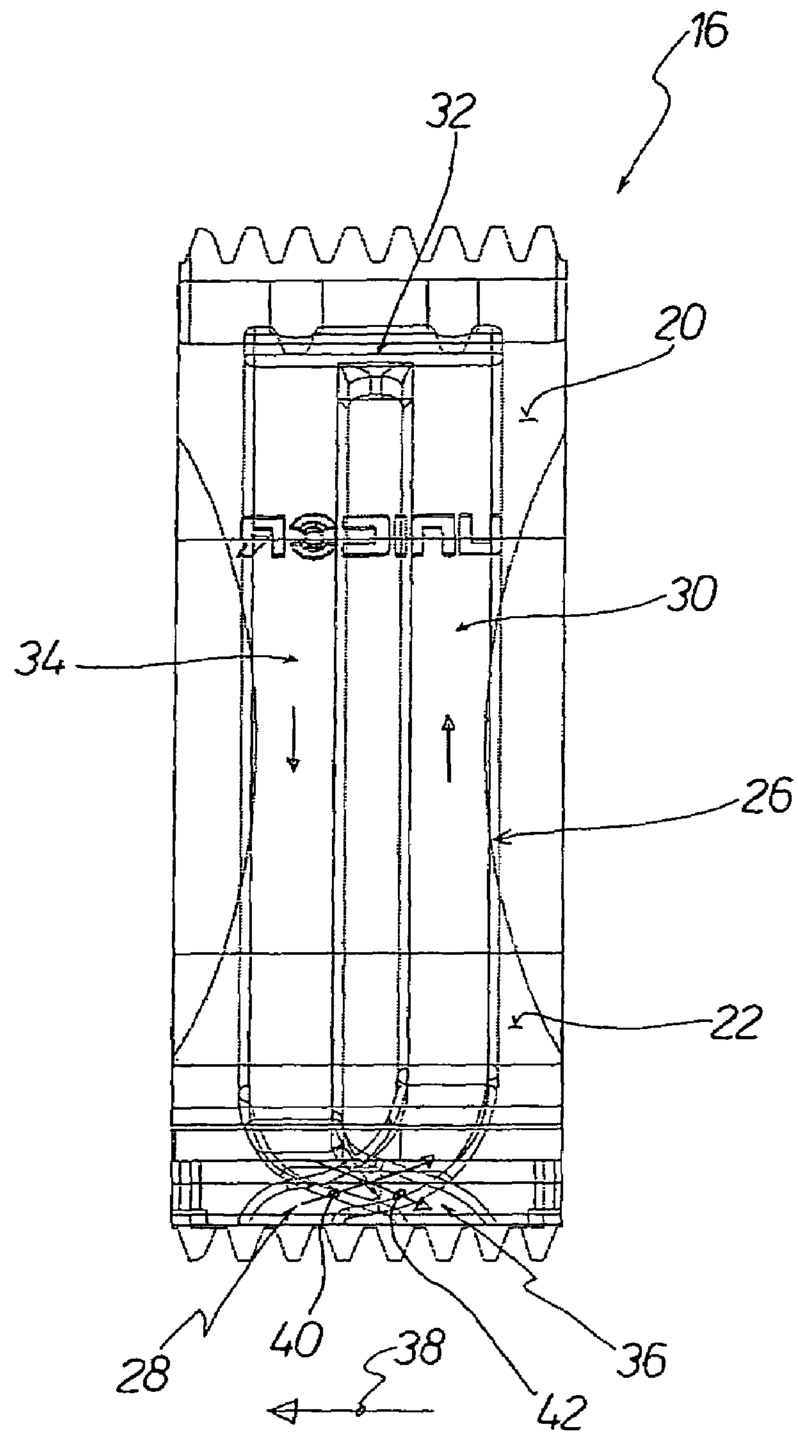
FIG. 3 shows a mold jaw half viewing in the direction of the arrow III in FIG. 2, that is to say in a direction viewing on to the end faces thereof.

To cool the mold jaw half 16 it is provided with a cooling passage 26, as is also illustrated in FIG. 3. The cooling passage 26 of the respective mold jaw half 16 has a coolant feed 28, an arcuate cooling passage main portion 30 adjoining the coolant feed 28, a cooling passage communication portion 32 adjoining the cooling passage main portion 30, a cooling passage main portion 34 adjoining the cooling passage communicating portion 32, and a coolant discharge 36 adjoining the last-mentioned cooling passage main portion 34.

The coolant feed 28 and the coolant discharge 36 cross as viewed in a direction viewing on to the end faces 20 and 22 of the mold jaw half 16, as is apparent from FIG. 3. In FIG. 3 the advance direction of the mold jaw half 16 is indicated by the arrow 38. FIG. 3 further shows that the coolant feed 20 and the coolant discharge 36 are oriented in opposite relationship with respect to the advance direction 38 of the mold jaw half 16. That is indicated by the arrows 40 and 42 associated with the coolant feed 28 and the coolant discharge 36. The arrow 40 indicates the flow direction of the coolant into the cooling passage 26 and the arrow 42 indicates the flow direction of the coolant out of the cooling passage 26.

As seen in a direction viewing on to the end faces 20 and 22 of the mold jaw half 16, the coolant feed 28 and the coolant discharge 36 are each of an arcuately curvedly extending configuration, as can be seen from FIG. 3, so that, during the advance movement of the mold jaw halves 16 in the direction of the arrow 38, the coolant is so-to-speak shovelled into the cooling passages 26 of the mold jaw halves 16 so that the flow resistance through the respective cooling passage 26 is reduced and the coolant through-put is correspondingly increased so that the cooling action of the coolant for cooling the respective mold jaw half 16 is correspondingly improved.

Figure 4:
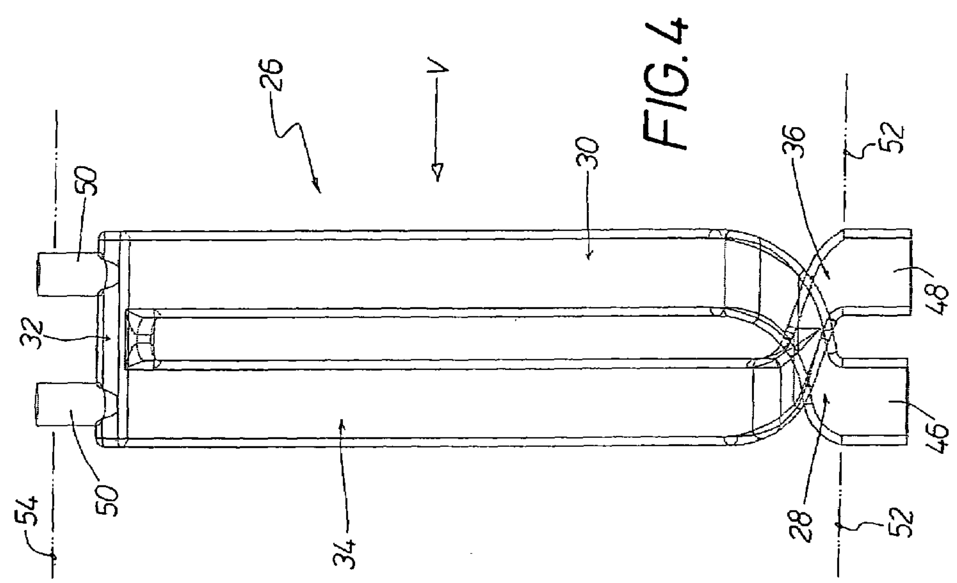
FIG. 4 shows an illustration of the cooling passage of the mold jaw half of FIG. 3 in the direction of view corresponding to FIG. 3.
Figure 5:
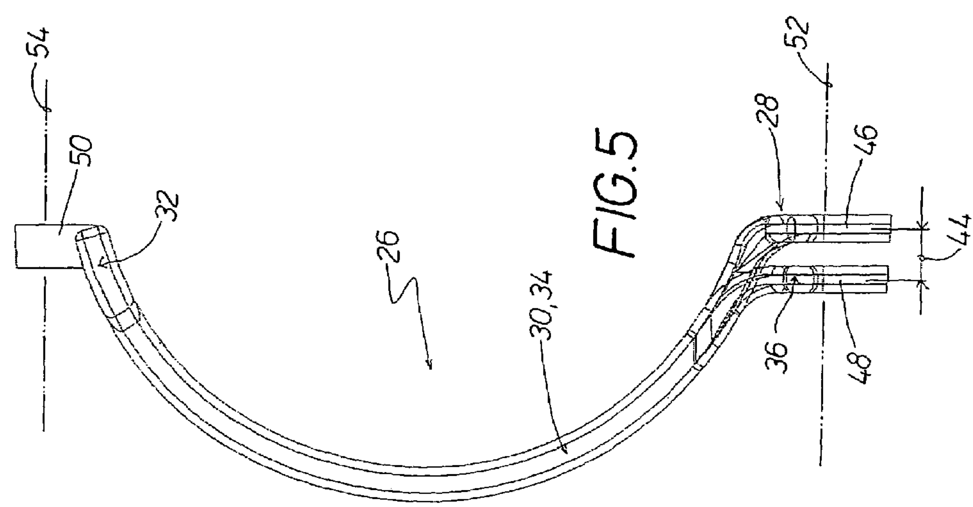
FIG. 5 shows a side view of the cooling passage of FIG. 4 viewing in the direction of the arrow V, wherein FIGS. 4 and 5 also still show the gate portions of the cooling passage.

FIGS. 4 and 5 show a cooling passage 26 alone, that is to say without the associated mold jaw half. It will be apparent from FIG. 4 that the cooling passage main portions 30 and 34 are provided oriented in mutually spaced and parallel relationship. FIG. 5 shows that the coolant feed 28 and the coolant discharge 36 of the cooling passage 26—viewed in the advance direction 38 of the mold jaw half 16—are laterally displaced relative to each other. That lateral displacement is illustrated in FIG. 5 by the double-headed arrow 44. The cooling passage main portions 30 and 34—viewed in the advance direction 38 of the mold jaw half 16—are of an arcuately extending configuration between the coolant feed and discharge 28 and 36 and the cooling passage communicating portion 32 remote therefrom and are provided in coincident relationship, as viewed in the advance direction 38 of the mold jaw half 16, as can be seen from FIG. 5.

FIGS. 4 and 5 also show the gate portion 46 adjoining the coolant feed 48, the gate portion 48 adjoining the coolant discharge 36 and two gate portions 50 which project integrally in respect of material away from the cooling passage communication portion 32. The gate portions 46 and 48 are severed along the double-dotted line 52. The gate portions 50 are severed along the double-dotted line 54.

The same details are denoted in each of FIGS. 1 through 5 by the same references so that there is no need for all features to be described in detail with reference to each of those Figures.

What is claimed is:

1. A pair of mold jaw halves for an apparatus for the production of transversely ribbed tubes, comprising:

two mold jaw halves each having end faces which are provided oriented in the advance direction along a mold section in mutually parallel and closely mutually juxtaposed relationship and bear closely and in positively locking relationship against each other and each having a base face, and having in its interior a cooling passage with a coolant feed and a coolant discharge for a coolant, which open at a spacing from each other at the base face of the mold jaw halves, wherein the coolant feed and the coolant discharge cross, as viewed in a direction viewing on to the end faces of the mold jaw halves, and are oriented in opposite relationship with respect to the advance direction of the mold jaw halves in order to provide that the coolant is shovelled into the cooling passage.

2. The mold jaw halves as set forth in claim 1, wherein the coolant feed and the coolant discharge, seen in a direction viewing on to the end faces, of the mold jaw halves are of a mirror-image symmetrical configuration.

3. The mold jaw halves as set forth in claim 1, wherein the coolant feed and the coolant discharge, seen in a direction viewing on to the end faces of the mold jaw halves, are each of an arcuately curvedly extending configuration.

4. The mold jaw halves as set forth in claim 1, wherein the coolant feed and the coolant discharge, as seen in the advance direction of the mold jaw halves, are laterally displaced relative to each other and adjoin arcuate cooling passage main portions which, seen in the direction viewing on to the end faces of the mold jaw halves, are in mutually spaced parallel relationship and which, seen in the advance direction of the mold jaw halves, are provided in coincident relationship.

* * * * *